Nov. 14, 1944.    H. W. KLINE    2,362,830

MODULATION MEASURING APPARATUS

Filed Nov. 23, 1942

Inventor:
Halsey W. Kline,
by Harry E. Dunham
His Attorney.

Patented Nov. 14, 1944

2,362,830

UNITED STATES PATENT OFFICE 2,362,830

MODULATION MEASURING APPARATUS

Halsey W. Kline, Schenectady, N. Y., assignor to General Electric Company, a corporation of New York Application November 23, 1942, Serial No. 466,613

4 Claims. (Cl. 179—171.5)

My invention relates to means for measuring or indicating the relationship between components of a modulated wave and more particularly to means for measuring or indicating the percentage or depth of modulation of radio frequency or carrier currents.

It is often desirable to measure or indicate the relationship between the components of a modulated wave, especially during the adjustment and operation of modulation equipment in communication systems. For example, it is desirable to operate a radio transmitter at a fixed percentage of modulation which should not be exceeded. It is, therefore, necessary to provide means whereby measurements and observations of the above mentioned condition may be readily observed.

Such measurement may be made in the laboratory with oscilloscopes and other laboratory instruments but these instruments are inconvenient to use at transmitting stations or at points of reception of transmitted signals where the operator usually does not possess laboratory experience and where it is desired to simplify the equipment as much as possible.

It is, therefore, an object of my invention to provide new and improved means for measuring or indicating the relationship between components of a modulated wave. It is also an object of my invention to provide a new and improved modulation indicator.

Figure 1:
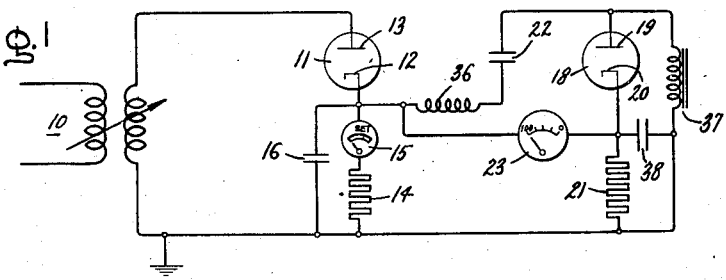
Figure 2:
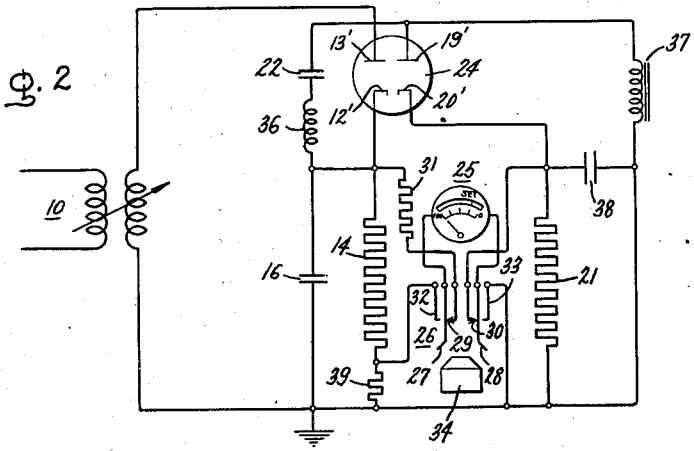

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a schematic diagram of one embodiment of my invention; Fig. 2 is a schematic diagram of a second embodiment of my invention; and Figs. 3 and 4 illustrate conditions of operation in the circuits of Figs. 1 and 2.

Referring to Fig. 1, there is illustrated a modulation indicating system for indicating the percentage or depth of a modulated wave obtained from a source of modulated carrier voltage or signal source such as a variable-coupling radio-frequency transformer 10. The modulated signal voltage is applied across a circuit comprising a rectifier which may be electron discharge means such as the diode 11, having a cathode 12 and an anode 13, and a load resistance 14 in series relationship. The positive alternations of the impressed voltage are rectified by the diode or rectifier means to pass current through the load resistance 14. During each such positive alternation the rectified voltage charges condenser 16 which is connected across the resistance 14. During the negative alternations of the impressed voltage there is no passage of current through the diode and therefore the condenser discharges through the resistance to ground.

Figure 3:
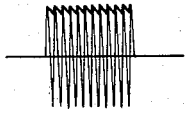
Figure 4:
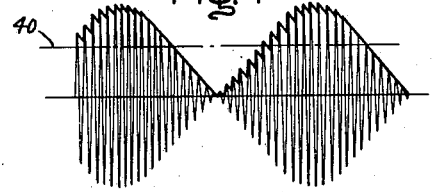

This action of the condenser is shown by the heavy lines in Figs. 3 and 4. As is well understood, the slope of the descending portion, representing condenser discharge, depends upon the time constant of the discharge circuit. Normally the time constant is chosen so that the voltage curve is relatively smooth but the charging and discharging of the condenser is exaggerated in the drawing to show clearly the operation of the circuit. In Fig. 3 there is illustrated an unmodulated carrier. Since the peak voltage of each alternation is the same, the rectified voltage is a substantially constant unipotential wave. In Fig. 4 there is shown a condition existing with 100% modulation and accordingly the heavy line representing the voltage across the resistance 14 varies from zero to twice the maximum voltage of the carrier wave. From the foregoing it is understood that the voltage across the resistance 14 contains a D.-C. component proportional to the carrier wave voltage and an A.-C. component representing the audio or modulating voltage.

The audio voltage, or A.-C. component, of the voltage appearing across the resistance 14 is coupled or impressed across a second circuit comprising a second rectifier which may also be an electron discharge means such as a diode 18, having an anode 19 and a cathode 20, and a load resistance 21 in series relationship. A coupling condenser 22 is inserted between the two circuits to prevent the D.-C. component of the carrier wave from being impressed across the second circuit. In order to prevent any radio frequency or carrier voltage from being introduced into the second circuit there is provided an inductance 36 in series with capacitor 22 of such value as to block radio frequency currents but to pass the audio component of the voltage introduced into the second circuit.

The discharge means 18 passes current on the positive portions of the audio voltage wave and at such times a unidirectional current proportional to the audio voltage passes through the load resistance 21. In order to provide a return path for the direct current in the second circuit there is provided a suitable circuit as, for example, an iron core inductance 37 connected from the anode 19 of the diode 18 to ground. In order to smooth out the pulsating direct current in the resistor 21, there is provided a capacitor 38, one side of the capacitor being connected to a point between the resistance 21 and the cathode 20 and the other side of the capacitor being connected to ground.

Means is provided for comparing the rectified voltages in the two circuits. In Fig. 1 this means takes the form of a high resistance direct current voltmeter as, for example, a voltmeter having a resistance of 20,000 ohms per volt connected between the cathodes 12 and 20, i. e., across the positive ends of the resistances 14 and 21. If the resistances 14 and 21 are properly chosen, the voltage drops thereacross are equal at 100% modulation. This is seen from inspection of Figs. 3 and 4 in which the average D.-C. voltage across resistance 14 is indicated by the heavy line in Fig. 3 and also by the dot-dash line 40 in Fig. 4. Under conditions of 100 percent modulation the average D.-C. voltage across the resistance 21 is also indicated by the dot-dash line 40. With the meter 23 connected as described above, the voltages tend to produce currents through the meter in bucking relationship and, under the conditions assumed, these opposing currents neutralize each other, or cancel out. For all conditions of less than 100 percent modulation the indicating means or meter 23 reads up scale an amount proportional to the modulation percentage.

The amplitude of the meter readings for conditions of less than 100% modulation depend upon the voltage input to the first circuit, that is, the voltage of the source 10 of modulated signal. If an approximation of the depth of modulation is sufficient, a single instrument 23, connected as described, is sufficient but if a relatively accurate reading is desired, means must be provided to insure that the input voltage is always of the same value. To enable the input voltage to be adjusted, a suitable D.-C. ammeter 15 may be connected in the first circuit. The ammeter 15 measures the average rectified D.-C. current in the first circuit, which is proportional to the carrier current, and is not affected by the A.-C. component of the rectified voltage and, therefore, is not affected by the depth or percentage of modulation. The reading of meter 15 at the time of calibration of meter 23 may be suitably marked as represented by the word "set." In order to use the instrument 23, the reading of ammeter 15 is first noted and then the voltage of the input is adjusted, as by varying the coupling of the transformer 10, to establish a current flow of sufficient value to cause the needle of meter 15 to move to the "set" position. After this adjustment has been made, the other indicating device 23 indicates accurately the depth of modulation.

The modulation indicator described herein may be used in connection with a radio receiving device as well as in connection with a radio transmitter. If the device is to be used at a receiving station, the input or source of modulation signal should be the output of the radio frequency amplifier system, or the input to the second detector, if a superheterodyne type of receiver is employed.

Inasmuch as the capacitive reactance of a condenser varies with frequency and since the capacitor 16 is in shunt with the resistance 14, the impedance of the circuit including capacitor 16 and resistance 14 varies as the modulation frequency varies. Accordingly, the voltage across the resistance varies. If the value of capacitive reactance of capacitor 16 and the resistance of resistor 14 are of the same order, the audio component across the diode varies over relatively wide limits, and the variation of impedance of the diode circuit according to the variations in the A.-C. component introduces errors into modulation indication. However, if the ratio of capacitive reactance to resistance is made relatively high as of the order of 3 to 1, or greater, for example, the effect will be relatively negligible. Thus for most accurate results it is desirable to choose the capacitor 16 and the resistor 14 of such values that the ratio of capacitive reactance to resistance is sufficiently high to minimize the effect of varying reactance of the capacitor with frequency.

In Fig. 2 there is illustrated a second embodiment of my invention which is the same in operation as that shown in Fig. 1 but which employs a double diode 24 containing two electron discharge means in one envelope, such as a 6H6 type tube, instead of two separate diodes. In this embodiment of my invention there is utilized a single meter 25 connected by means of a suitable double pole, double throw switch 26 to read either the current through the resistance 14 or the voltage across the cathodes 12' and 20'. In Fig. 2 like numerals are used for like elements of Fig. 1.

The instrument 25 is connected to flexible center contacts 27 and 28 which are normally biased to engagement with another set of contacts 29 and 30, respectively, which, in turn, are connected to the cathode 12' through a suitable multiplier or current limiting resistance 31 and to the cathode 20', respectively. Thus in the normal position of the switch the meter is connected as a voltmeter between the cathodes 12' and 20'. The switch also comprises outer contacts 32 and 33 connected across a resistor 39, the resistor constituting a shunt for the ammeter. If the operating member or push button 34 is pressed inwardly to move the resilient arms 27 and 28 into engagement with the outer contacts 32 and 33, the instrument 25 is connected as an ammeter across the shunt resistance 39.

The manner of operation is the same as that described for the embodiment shown in Fig. 1.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. An apparatus for measuring the degree of modulation of a modulated carrier voltage comprising a source of modulated carrier waves having one terminal connected to a common point of predetermined fixed potential, means including a first load resistor having one end connected to said common point for rectifying said carrier wave to obtain a unidirectional voltage having an alternating component and a mean value, means including a second load resistor having one end connected to said common point for rectifying said alternating component of voltage to obtain a second unidirectional voltage, and a direct current indicating instrument having a single coil connected to measure the difference of said second unidirectional voltage and said mean value of said first unidirectional voltage.

2. An apparatus for measuring the degree of modulation of a modulated carrier voltage comprising a source of modulated carrier waves having one terminal connected to a common point of predetermined fixed potential, means including a first load resistor having one end connected to said common point for rectifying said carrier waves to produce a unidirectional voltage having an alternating component and a mean value, means including a second load resistor having one end connected to said common point for rectifying said alternating component of voltage to obtain a second unidirectional voltage, said second rectifying means including means for preventing the steady component of said first unidirectional voltage from affecting said second unidirectional voltage, and a direct current indicating instrument having a single coil connected between electrically spaced points on said load resistors to measure the difference of said mean unidirectional voltage and said second unidirectional voltage.

3. An apparatus for measuring the degree of modulation of a modulated carrier voltage comprising a source of modulated carrier waves having one terminal connected to a common point of predetermined fixed potential, means including a first load resistor having one end connected to said common point for rectifying said carrier wave to obtain a unidirectional voltage having an alternating component and a mean value, means for adjusting said mean value of unidirectional voltage to a predetermined desired intensity, means including a second load resistor having one end connected to said common point for rectifying said alternating component of voltage to obtain a second unidirectional voltage, and a direct current indicating instrument having a single coil connected to measure the difference of said mean unidirectional voltage and said second unidirectional voltage.

4. An apparatus for measuring the degree of modulation of a modulated carrier voltage comprising a source of modulated carrier waves having one terminal connected to a common point of predetermined fixed potential, means including a first load resistor having one end connected to said common point for rectifying said carrier wave to obtain a unidirectional voltage having an alternating component and a mean value, means for adjusting said mean value to a predetermined desired intensity, means including a second load resistor having one end connected to said common point for rectifying said alternating component of voltage to obtain a second unidirectional voltage, a direct current indicating instrument having a single coil, means for connecting said coil between electrically spaced points on said resistors to measure the difference of said mean unidirectional voltage and said second unidirectional voltage, and switching means for temporarily disabling said connection and connecting said coil to measure the intensity of said mean unidirectional voltage alone thereby to permit adjustment of said mean voltage to said desired intensity.

HALSEY W. KLINE.